June 13, 1939.  D. S. WILLIAMS  2,162,236
TRAP SEAL VALVE
Filed April 19, 1937
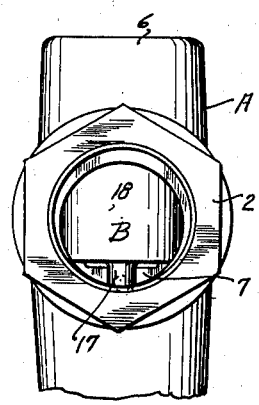
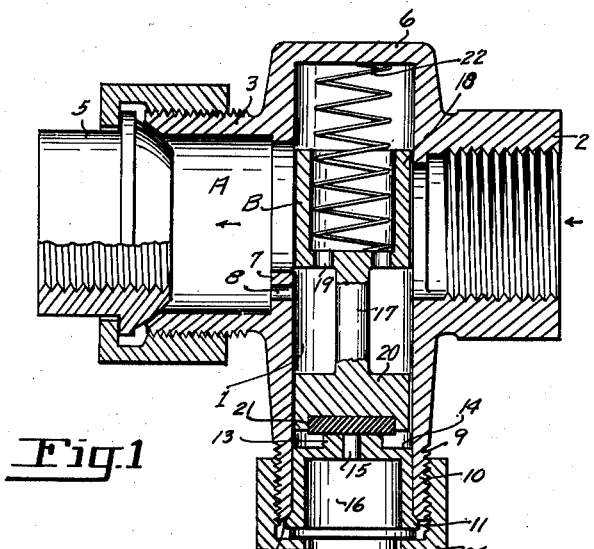
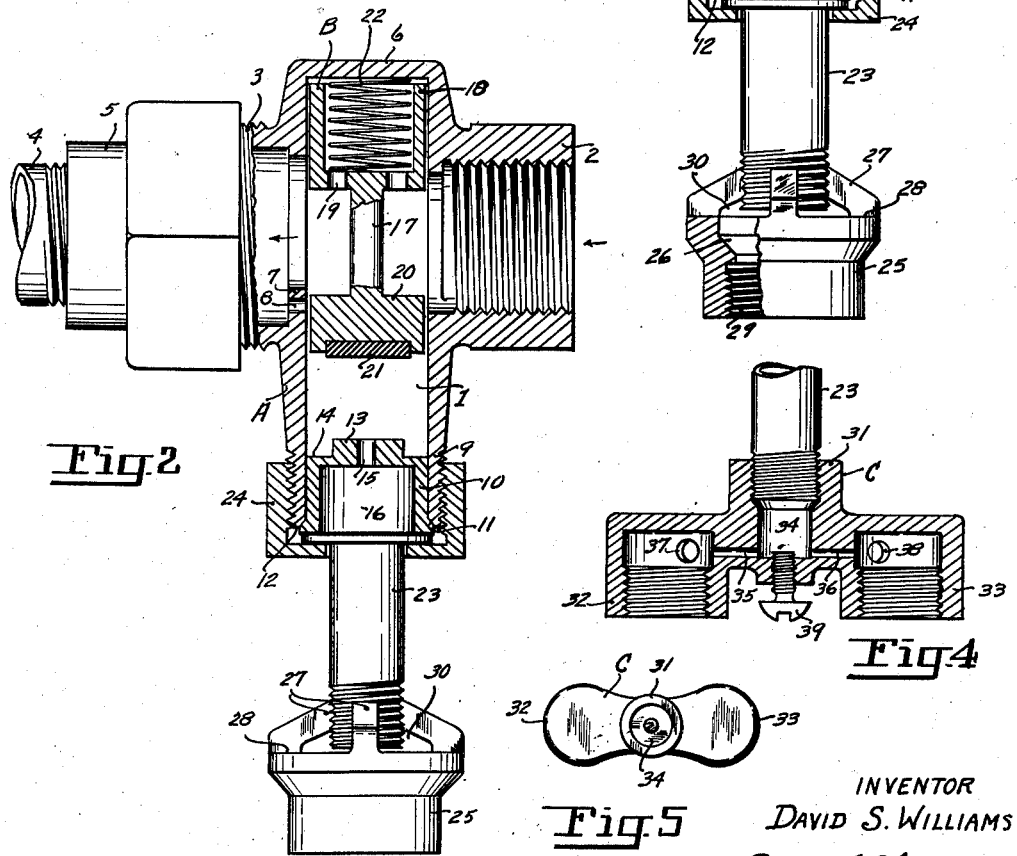
INVENTOR
DAVID S. WILLIAMS
Samuel S. Jacobson
ATTORNEY Patented June 13, 1939

2,162,236

UNITED STATES PATENT OFFICE 2,162,236

TRAP SEAL VALVE

David S. Williams, Portland, Oreg.

Application April 19, 1937, Serial No. 137,727

8 Claims. (Cl. 182—12)

My invention in its general aspect relates to valves and other devices the principal characteristic of which is to supply a small quantity of water to any fixture which requires such water in order to function effectively, such as drain traps, humidifier pans, and like fixtures.

My present invention, although related to my patents on Primer valves granted July 24, 1934, and bearing Letters Patents Nos. 1,967,643, 1,967,644, and 1,967,645, applies somewhat different principles and, in addition, embodies entirely new structure; and, while the subject matter of this present application is capable of fulfilling substantially all of the objects set forth in the above-identified Letters Patents, there are additional features in this invention which permits its use for a much wider and more varied range of scope and utility.

It has been found that, when the water seal in the trap of a floor drain or similar fixture is broken due to evaporation or other causes, obnoxious sewer gases, vermin, and other foreign substances may and do enter into the dwelling or building which does not provide means for preventing the breaking of the water seal in its floor drains or similar fixtures. Various devices have been employed in order to insure that a water seal will be maintained at all times in such fixtures as require such a seal.

The importance of maintaining a water seal at all times cannot be questioned since many cities in the United States have provided in their plumbing codes that some device be used for such a purpose. The use of valves for supplying the water to the traps of floor drains and similar fixtures is more advantageous than any other type of device performing the same functions since they automatically deliver a small quantity or water whenever water is made to flow within the water supply line to which they are connected.

That the flow of a liquid is subject to retardation by obstacles placed in its way is elementary. It is within the contemplation of my invention to provide a valve of simplified construction for supplying water to the trap of a floor drain or similar fixture which offers little resistance to the normal flow of water in the supply line. This is accomplished by placing the transverse bores in direct alignment with each other, so that, when the valve is connected to the water supply line, the water therein is not required to change the direction of its flow, but may pass directly through the valve as it flows from the supply line toward the service connection. The resistance offered by the piston valve is imperceptible and the rate of flow of the water within the supply line is, therefore, imperceptibly diminished. It is also within the contemplation of my invention to permit the use of one valve for supplying water to more than one trap, insuring, at the same time, against back siphonage from these traps into the water supply line to which the valve is connected.

The controlling object of my invention is to provide a valve which, when connected to a water supply line, automatically responds to the flow of water under pressure so that, whenever the water flows through the line and valve, some of the water will be by-passed into a secondary line leading to the trap of a drain or any other fixture which requires water to maintain a seal in order to insure against obnoxious gases, vermin and undesirable foreign substances entering into the dwelling or building possessing such fixtures.

The quintessence of my invention is to provide means for replenishing the water in the trap of floor drains or similar fixtures, thus preventing the emanation therefrom of undesirable gases and other foreign substances; to provide means for distributing said water to more than one floor drain or similar fixture; and to provide means for preventing back siphonage of the foul water and gases contained in the traps of floor drains into the water supply line to which the valve is connected.

Another object of my invention is to provide a valve which, when once installed and made a part of the water supply line, will automatically reciprocably respond to the pressure within the line as the water flows therethrough and thereby permit the by-passing of a portion of said water, the said valve when once installed being capable of efficiently performing its function for a long period of times without the need of attention or adjustment.

It is commonly known that any unusual draft of water within the water supply system tends to cause the flow to reverse itself and induce the establishment of a vacuum condition within the water line. Unless effectively controlled, back siphonage of the polluted water, gases or other foreign substances contained within the trap of a floor drain or any like fixture will occur, when the same is connected to a valve in a supply line. The foul matters referred to will be drawn into the supply line and contaminate the water therein. It is within the contemplation of my invention to prevent such an occurrence. This is accomplished by providing vents between the valve and the trap of a floor drain or similar fixture and eliminating the necessity of directly connecting the valve and the trap of the floor drain.

Other objects and advantages, together with the nature and characteristic features of my present invention, will become apparent and readily understood from an analysis of the following specification wherein the details of construction, as embodied in the valve and related structures shown in the accompanying drawing illustrating, by way of example, the preferred embodiment, and in which the significance of the reference characters applied thereto and the mode of operation of the invention are pointed out and explained.

In the drawing:

Figure 1 is a sectional, side, elevation of a valve embodying the principles of my invention as it appears when in a state of inactivity.

Figure 2 is also a sectional, side, elevation of a valve embodying the principles of my invention, but shows the valve as it appears when fully in operation.

Figure 3 is a fragmentary, end, elevation of the intake end of the valve shown in Figure 1 graphically disclosing the position of the piston when at rest.

Figure 4 is a sectional, side, view of a combination water divider and siphon-break coupling to be used in supplying water to more than one drain trap.

Figure 5 is a top view of the unit shown in Figure 4.

Corresponding parts are identified by the same reference characters.

The valve, as illustrated, embodies the principles of my invention and is composed of a body-member, generally designated by reference character A. The interior of the body-member consists of an elongated cylindrical cavity or chamber 1 disposed vertically with respect to the body-member. An internally threaded boss 2 extends outwardly at right angle from the body-member and communicates with the chamber 1. An externally threaded boss 3 also extends outwardly at right angle from the body-member and communicates with chamber 1. Bosses 2 and 3 are disposed directly opposite to and are therefore in registerable alignment with each other, providing, as a result of such alignment, a substantially unobstructed transverse bore through the body-member A so that there is ample passageway for the unimpaired flow of the water therethrough. The water supply line (not shown) is connected to boss 2, so that the normal flow of the water is in the direction shown by the arrows in Figures 1 and 2; and a conduit 4, leading to a service fixture such as a water faucet (not shown), is connected to boss 3 by any desirable means as by coupling 5. Such an arrangement permits the valve to be placed directly in line between the water supply and the service fixture. The body-member A has a cap 6 shown as an integral part thereof in the drawing, although the cap may be threadably engaged to the body-member if such construction is desired. A wall 7 is provided at a point, where the boss 3 joins chamber 1, and this wall extends upwardly from the base of boss 3 for a short distance. The height of the wall is determined by the position of the piston valve, when it is in a state of rest as shown in Figures 1 and 3. Wall 7 has a port extending therethrough which communicates with the chamber 1 and the interior of boss 3. The position of port 8 within wall 7 is such that its base lies in the same plane as the base of boss 2. The purpose of such an alignment and the value of the wall will be pointed out forthwith. Body-member A is externally threaded as shown at 9.

A cup-shaped member 10 is removably insertable for a short distance into the interior of chamber 1, so that its flange 11 rests on the periphery 12 of the lowermost portion of body-member A. A valve seat 13 extends upwardly from the top 14 of the member 10 and a port 15 passes vertically through the valve seat and communicates with the chamber 1 and the interior 16 of the member 10.

A piston valve, generally designated by reference character B, is vertically mounted within chamber 1 for simple reciprocatory motion and consists of a rod 17 upon the upper end of which a cupped piston 18 is integrally placed. The outer circumference of piston 18 is slightly less than the inner circumference of the chamber 1, thus providing room for the piston to slide freely within chamber 1. One or more relief ports 19 are disposed through the base of piston 18, the purpose of which is to prevent water from being trapped within the cup of the piston. A cylindrical member 20 is integrally formed upon the opposite end of rod 17. A recess is formed within the under side of the member 20 into which a valve disc 21 is inserted and, although shown held frictionally, it may be held in place by any other suitable means. The composition of the valve disc 21 is such as to insure the sealing of port 15, when the disc rests upon the valve seat 13. It is obvious that the outer circumference of member 20 must be less than the inner circumference of chamber 1 in order that the piston valve B may reciprocate freely within the chamber. It need not, however, have the same circumference as cupped piston 18, since the circumference of the member 20 may be increased or decreased in order to meet the requirements of the water in which the piston valve B must operate, because the composition of the water, the normal pressure in the water line, and the quantity of water which it is desired to have bypassed determines, to a large extent, the relationship between member 20 to the inner wall of chamber 1. Member 20 assists in maintaining the piston valve in vertical alignment during its reciprocation. It also tends to remove any sediment which may cling to the inner wall of chamber 1. It further functions to regulate the quantity of water which is to be by-passed as well as the rate of flow of water. And finally, its weight aids in maintaining port 15 sealed, when the piston valve B is inactive.

In order to insure that the piston valve B will return to the position, as shown in Figure 1, when the flow of the water is arrested, a resilient member, such as spring 22, is inserted within the cup of the piston 18 and bears thereagainst at all times so that one end of the spring rests on the base of the piston and the other end rests on the ceiling of the cap 6. While spring 22 is maintained in a compressed condition, even when the piston valve is seated as shown in Figure 1, the resistance which it offers to the reciprocation of the piston valve is not of sufficient moment to materially reduce the rate of flow of the water.

A flanged pipe 23 is positioned against the flange of shaped member 10 so that its interior coincides with the interior 16 of the member. The member 10 and pipe 23 are held tightly against each other by union coupling 24.

An internally threaded coupling member 25, the upper portion of which inclines rearwardly to provide within the interior thereof an annular groove 26, has a plurality of internally threaded arms 27 extending from its top 28. These arms 27 are adapted for threaded engagement to the pipe 23. The pipe (not shown), which leads directly to the trap of the floor drain or similar fixture, is secured to coupling member 25 through its engagement with the internal threads 29 found within the member. It is apparent from this construction that there is no direct connection between the valve member A with the trap of the floor drain or similar fixture to which member 25 is joined. Furthermore, there is provided a plurality of enlarged openings 30 which function to prevent the siphonage of the polluted materials within the trap of a floor drain or similar fixture back into the valve body A should the water in the water supply line reverse its normal flow therein due to the creation of negative pressure by some abnormal condition.

*Modus operandi*

For the effective operation of water distributing systems it is necessary that sufficient pressure be maintained in the supply lines at all times. The successful operation of the valve embodying the principles of my invention depends entirely upon this pressure which is utilized for automatically actuating the piston valve whenever water in the supply lines to which the valve is connected is caused to flow. The reciprocation of the piston valve B is confined between the cap 6 of member A and the valve seat 13 of cup-shaped member 10. When the water in the supply lines is in a state of rest, the valve embodying the principles of my invention is in the position as shown in Figures 1 and 3. It will be noted that, when the valve is in the position as shown in those two figures, the valve disc 21 rests upon valve seat 13 and seals port 15 so that the communication between the port 15 and the interior of chamber 1 is broken and no water can pass from this chamber through port 15 and into pipe 23. When the valve is in this dormant state, the base of cup-shaped piston 18 is positioned slightly above the wall 7 and does not block the port 8 in wall 7. When a service fixture is opened, the water within the supply line is put into flowing motion, since the pressure on the side of the valve leading to the service fixture is reduced. Consequently, the water, in its desire to reach the side of the valve in which there is a low pressure, surges toward that side. As the water rushes through the pipe connected to boss 2 and into chamber 1, only a small portion of the water can pass through port 8, but the greater portion of the water must overcome the slight resistance offered by the weight of the valve piston and compressed spring 22 before it can reach the other side of wall 7 in order to flow toward the open service fixture, and as a consequence of this action of the water, the piston valve B is raised to the position shown in Figure 2. When the valve piston is in the position as shown in Figure 2, the water can flow freely through the body-member A. Even the slighest raising of the piston valve is sufficient to expose the port 15 and, since some of the water passing through the valve in its travel toward the opened service fixture will be by-passed around member 10, this water will flow through the port 15 the moment it is exposed, and will then pass into pipe 23. Since pipe 23 is indirectly connected to the trap of a drain or similar fixture, the water will eventually flow into the trap. It should be appreciated from the illustration and detailed description that little resistance is offered to the flow of water as it passes from the supply line toward the service fixture and, consequently, the normal flow of water remains unimpaired although it is required to perform some work in its travel from the supply line toward the service fixture.

The importance of a member like coupling 25 as insurance against the pollution of the water supply line when a valve of the type heretofore described is employed to supply water either continuously, periodically, or intermittently to a trap for floor drains or similar fixtures cannot be overestimated. Should the flow of water through the water supply line and valve be reversed in the direction opposite to that indicated by the arrows in the figures through any cause, such as a major break in a water main, thus creating a vacuum condition in the line, this vacuum tends to siphon up any substance within the water line and valve. When such a condition exists in the water supply line and a coupling of the type illustrated is employed as an adjunct to the effective and safe use of a valve of the type illustrated and described, air is permitted to be drawn into the water supply line through openings 30, which effectively prevents the siphoning of any materials within the trap of a floor drain or similar fixture which is connected to coupling 25. The vent openings possessed by the combination water divider and siphon-breaking coupling member, hereinafter to be described, perform the function.

In Figures 4 and 5 is shown a combination water divider and siphon-breaking coupling member generally designated by reference character C, which in addition to performing the functions performed by coupling member 25 permits the division of the water by-passed from the valve into two or more streams for servicing two or more traps of floor drains or similar fixtures. This will become apparent from the description which follows. An internally threaded boss 31 extends upwardly from the member C and is capable of threadable engagement with pipe 23. Downwardly extending, internally threaded bosses 32 and 33 are adapted for engagement with pipes (not shown) leading to two traps of floor drains or similar fixtures. It is of course possible to provide for servicing more than two traps by adding additional structure to member C but which possess the same characteristics. A chamber 34 is formed within the member C. Transversely extending ports 35 and 36 are disposed within the body-member C and communicate respectively with the interiors of bosses 32 and 33 as well as with chamber 34. When boss 31 is threaded to pipe 23, the pipe leads directly into the interior of chamber 34. Vent openings 37 and 38 are disposed through the bosses 32 and 33 respectively. In order to permit the removal of sediment which may accumulate within the chamber 34 and in order to permit the cleaning of the ports 35 and 36 without disconnecting the member C from the pipe 23, a threaded opening is formed within the body-member which communicates with the base of chamber 34 and threaded member 39 is removably engaged therein. This threaded member also serves the additional function of regulating the rate of flow of the water toward the ports 35 and 36 as it comes into chamber 34 through pipe 23.

The substitution of the water divider and siphon-breaking coupling member C for the coupling member 25 does not alter in any manner the operation of the valve connected to the supply line, but allows for the distribution of water to more than one trap although one valve is employed.

From the foregoing description, it will undoubtedly appear that the invention satisfies the objects and points out the advantages claimed for this invention. While the invention has been described in connection with a specific embodiment, it should be understood that variants thereof are possible to those skilled in the art. The invention, therefore, in its broader aspect, is not limited to the specific construction herein shown and described, since changes and alterations may be made in the proportions and arrangements of the various parts without departing from the spirit of the invention.

Having thus described my invention what I claim as new and upon which I desire to secure Letters Patent is:

1. A valve of the class described comprising a body-member that is adapted for connection to and be made a part of a water supply line, said body-member having an elongated chamber therein, a valve seat removably positioned within the lower portion of the chamber in said body, having an outlet port confined within the boundary of said seat and communicating with the chamber of said body-member, and a piston valve confined within the chamber of the body-member and normally positioned against said seat, but adapted for vertical reciprocation therein under the influence of the flow of water through said body-member.

2. In a valve as characterized in claim 1 including means secured to the body-member and communicating with the outlet port adapted to provide an atmospheric vent thereto in order to act as a siphon break for said water supply line.

3. A valve of the class described having a body-member with inlet and outlet connections in direct alignment with each other and a chamber therein, a valve seat fitted within said chamber and having an outlet port therethrough communicating with said chamber through which a liquid may pass to be delivered to a fixture requiring the replenishment of its water supply, a piston valve confined within said chamber and adapted for vertical reciprocation therein, said piston valve comprising a rod, a hollow piston secured to the upper portion of said rod, and valve means secured to the lower portion of said rod for controlling the passage of water through said outlet port, said piston valve adapted for being actuated by the passage of water through said inlet and outlet connections.

4. A valve of the class described for supplying water to any fixture requiring a liquid for effective use, defined in part as comprising a body-member having an elongated chamber therein and a pair of bosses disposed transversely of and communicating with said chamber by which said body-member may be connected to a water supply line, said bosses being in direct alignment with each other to provide a direct and substantially unimpaired passage through said body member, a member, having a valve seat formed thereupon, removably disposed within said chamber, said member having a port therethrough which is surrounded by said valve seat, and a piston valve spring-compressed and confined within said chamber for vertical reciprocation therein, said piston valve responsive to the intermittent, periodic, or continuous flow of water under pressure whereby the raising of said piston valve unseals the port within the member.

5. In a valve characterized in claim 4, including a resilient element positioned to normally retain the piston valve upon the outlet port.

6. A valve of the class described comprising a body-member having an elongated chamber therein and a transverse bore therethrough, a cup-shaped member, having a seat thereon and a port therethrough, disposed within said body-member, a piston valve confined within said chamber and responsive to the pressure of a liquid passing through the bore of the body-member, a resilient element compressed against the piston valve adapted to offer imperceptible resistance to the vertical reciprocation of said piston valve, when said piston valve is forced to respond to the flow of water under pressure through the bore, and means secured to said body member for preventing back siphonage.

7. A valve of the class described comprising a body-member that is adapted for connection to and be made a part of a water supply line, said body-member having an elongated chamber therein, a valve seat positioned within the body, having an outlet port conlned within the boundary of said seat and communicating with the chamber of said body-member, a piston valve confined within the chamber of the body-member and normally positioned against said seat, but adapted for vertical reciprocation therein under the influence of the flow of water through said body-member, said piston valve comprisnig a rod, a cup-shaped piston secured to the top of said rod the base of which has one or more relief ports and the circumference of which is slightly less than the circumference of the chamber in which the piston valve is confined, and a valve seat holding-member secured to the lower end of the rod the circumference of which is slightly less than the circumference of the inner wall of the chamber.

8. A water divider and siphon-break to be used with any valve of the type which intermittently, periodically, or continuously by-passes water toward a fixture requiring such water, comprising a body-member having an upwardly extending boss therein communicating with a chamber disposed within said body-member and having one or more downwardly extending bosses, ports in the body-member positioned to permit communication between the chamber and the downwardly extending bosses, vent openings in each of said downwardly extending bosses, and a cleaning and water-regulating member threadably connected to said member and adapted for threadable insertion within the said chamber.

DAVID S. WILLIAMS.